United States Patent [19]

Eckerfeld

[11] Patent Number: 4,779,038

[45] Date of Patent: Oct. 18, 1988

[54] ELECTRIC CONTINUOUS-FLOW WATER HEATER WITH CONTROLLABLE OUTLET TEMPERATURE AND ELECTRONIC POWER OUTPUT STAGE THEREFOR

[75] Inventor: Alfred Eckerfeld, Hüttenweg, Fed. Rep. of Germany

[73] Assignee: Erika Eckerfeld, Heiligenhaus, Fed. Rep. of Germany

[21] Appl. No.: 839,787

[22] PCT Filed: Jul. 6, 1985

[86] PCT No.: PCT/EP85/00329

§ 371 Date: Mar. 14, 1986

§ 102(e) Date: Mar. 14, 1986

[87] PCT Pub. No.: WO86/00689

PCT Pub. Date: Jan. 30, 1986

[30] Foreign Application Priority Data

Jul. 14, 1984 [DE] Fed. Rep. of Germany ....... 3426046
Oct. 11, 1984 [DE] Fed. Rep. of Germany ....... 3437242

[51] Int. Cl.⁴ ............................................. G05F 1/455
[52] U.S. Cl. ................................... 323/322; 323/241; 323/243
[58] Field of Search ............. 323/235, 239, 241, 242, 323/243, 319, 322, 324, 325, 326, 902

[56] References Cited

U.S. PATENT DOCUMENTS 4,090,107 5/1978 Seib ................................. 323/322 X
4,317,975 3/1982 Mizukawa et al. ............. 323/241 X
4,463,269 7/1984 Yashima .......................... 323/324 X

Primary Examiner—Peter S. Wong
Attorney, Agent, or Firm—Lee & Smith

[57] ABSTRACT

An electric continuous-flow water heater generates a basic power with heating resistors in heating passages and a controllable power with three heating resistors in heating passages. The controllable power is controlled by a control system through a triac. At low flow rates two phases and a low controllable basic power is connected to the heating resistors. At high flow rates the heating resistors are star-connected and the controllable heating-resistors are delta-connected. An electric power output stage comprises a mains rectifier bridge, a Schmitt-trigger connected to the output thereof and a frequency divider with two outputs.

The signals at the outputs are set by an edge of each third pulse and are reset by the corresponding edge of the following or next but one pulse. A semiconductor relay is optionally by the signals at the outputs through a selector switch or a logic circuit and is rendered conductive for one, two or three half waves.

6 Claims, 5 Drawing Sheets

ELECTRIC CONTINUOUS-FLOW WATER HEATER WITH CONTROLLABLE OUTLET TEMPERATURE AND ELECTRONIC POWER OUTPUT STAGE THEREFOR

The invention relates to an electric continuous-flow water heater with controllable outlet temperature, comprising
 (a) a through-flow path with a plurality of heating passages connected in series in the flow path,
 (b) three-pole switching means arranged to be connected to three phases of a three phase current and responding to flow rate in the through-flow path,
 (c) a temperature sensor arranged on the outlet side in the through-flow path,
 (d) first heating resistors, which are arranged in some of these heating passages and are arranged to be switched on by the switching means when a predetermined flow rate has been reached,
 (e) second heating resistors, which are arranged in other ones of these heating passages, and
 (f) a control system, which is connected to the temperature sensor and by which the second heating resistors are controllable through electronic power output stages in order to maintain a desired value.

The invention relates also to an electronic power output stage, particularly for controlling the outlet temperature of electric continuous-flow water heaters, comprising
 (a) a rectifier bridge connected to a mains-frequency a.c. voltage and supplying a d.c. voltage pulsating with twice the mains-frequency,
 (b) a Schmitt-trigger, to which the pulsating d.c. voltage is applied for generating a square wave pulse sequence with twice the mains frequency,
 (c) a frequency divider, to which the square wave pulse sequence is applied,
 (d) a semiconductor relay with zero voltage switch performance connected to the mains a.c. voltage and arranged to switch the power, and
 (e) means for controlling the semiconductor relay as a function of output signals of the frequency divider.

The control of the outlet temperature with electric continuous-flow water heaters presents special problems. Electric continuous-flow water heaters have a very high installed heating capacity of, for example, 22 kW. The outlet temperature must be maintained very exactly and is only allowed to hunt slightly around the desired temperature. It is difficult to control the heating capacity with corresponding sensitivity.

The electric heating capacity can be controlled continuously by a phase control. But a phase control of the high power present here is not permissible because of the higher harmonic waves generated and the disturbances caused thereby. It is only permissible to switch the alternating current fully on or off, whereby a zero voltage switch takes care that the switching on and the switching off occur always at moments at which the a.c. voltage passes through zero anyway, such that no phase control occurs.

But a control of the heating power by switching on or off requires a relatively high switching frequency, if the requirement is to be met, that a desired outlet temperature is maintained with high accuracy. If the heating capacity would be switched on and off with low switching frequency, too cold or too hot water would alternately flow out of a continuous-flow water heater, even if the average heating power corresponds to the desired temperature. But a high switching frequency of the switching on and off of a high heating power results again in other problems: The high heating power of the electric continuous-flow water heater affects the mains-frequency due to the mains impedance. Therefore a high switching frequency would be accompanied by an unpleasant flicker of electric filament lamps. Therefore the switched heating power permitted by the public utility company is the smaller the higher the switching frequency is. These requirements counteract the efforts to control the outlet temperature of a continuous-flow water heater of high power with high accuracy.

For this reason it is known to subdivide the installed heating power in an electric continuous-flow water heater into at least two stages. Thereby a control system with a temperature sensor arranged in the outlet switches only a respective one of the stages for the temperature control (DE-OS No. 28 37 934).

From DE-OS No. 28 37 934 a device is known for controlling the outlet temperature of electric continuous-flow water heaters, which device permits an accurate control of the outlet temperature also with continuous-flow water heaters of high power of, for example, 22 kW. According to DE-OS No. 28 37 934 this is achieved in that the installed heating power of the continuous-flow water heater is subdivided into at least two stages and only one stage respectively is switched for the temperature control. Thus a fixed heating power is applied to the continuous-flow water heater, said fixed heating power being not affected by the control action of the temperature control system. The temperature control occurs by a stage of the heating power which can be substantially smaller than the total heating power of the continuous-flow water heater. The smaller heating power of this stage can then be switched with a correspondingly high frequency during control action, such that accurate maintaining of a desired outlet temperature is ensured.

A through-flow path with a plurality of heating passages connected in series in the flow path is provided in the continuous-flow water heater known from DE-OS No. 28 37 934. Furthermore the electrical continuous-flow water heater comprises switching means responding to flow rate in the through-flow path, said switching means preferably being of the three-pole type and being arranged to be connected to the three phases of a three phase current. A temperature sensor is arranged on the outlet side in the through-flow path. First heating resistors are arranged in some of these heating passages and are arranged to be switched on by the switching means when a predetermined flow rate has been reached. Second heating resistors are arranged in other ones of these heating passages.

A control system is provided in the continuous-flow water heater according to DE-OS No. 28 37 934, said control system being connected to the temperature sensor and controlling second heating resistors through a electronic power output stages in order to maintain a desired value. A rectifier and control stage connected to the mains frequency generates a square wave voltage syncronous with the mains frequency and of twice the mains frequency. The output signal of the control system, which is provided by a temperature sensor arranged in the outlet, is applied to comparators with stepped reference signals. The output signals of the comparators and the outputs of the binary counter are applied to a logic circuit, the electronic switching means being controlled by the output signal, such that an increasing number of half-waves of the mains a.c. voltage is periodically permitted to pass when an increasing number of comparators responds. In the known arrangement a binary counter with a single counter stage is provided for switching the heating power in two stages by two comparators. The logic circuit comprises an AND-gate, to the inputs of which the counter stage and the output of the comparator with the lower reference signal are applied. The logic circuit comprises also an OR-gate, to the inputs of which the output of the AND-gate and the output of the comparator with the higher reference signal are applied. The output of the OR-gate represents the output of the logic circuit.

Furthermore it is known from DE-OS 28 37 934 to control part of the heating power continuously by means of a pulse width modulator with constant clock frequency. The pulse width modulator is controlled by the output signal of the control system. The pulse width modulator has a comparator, to which the output signal of the control system and a saw-tooth signal of constant clock frequency as reference signal are applied, such that the comparator supplies an output signal during the respective intervals, during which the output signal of the control system is higher than the reference signal. When a stage of the heating power is connected into circuit through a comparator, a signal appears at the output of this comparator and is applied to the comparator of the pulse width modulator as an additional signal superimposed to the reference signal, such that the heating power controlled by the pulse width modulator is reduced by the heating capacity of the stage connected into circuit.

Preferably the electric continuous-flow water heater has heating coils as heating resistors which are arranged uninsulated in the heating passages, and water resistance passage arranged upstream and downstream and permitting the inlet and outlet of the electric continuous-flow water heater to be grounded.

Further it is known from DE-OS No. 28 37 934, to provide several groups of heating resistors, which are arranged to be connected into circuit in addition to the heating resistors with a heating power continuously controllable as a function of the output signal of the control system and thus of the outlet temperature. In prior art devices constructed in accordance with DE-OS No. 28 37 934 the heating passages for the heating coils with continuously controllable heating power and the heating resistors arranged to be permanently switched on are provided in separate passage blocks, which are interconnected by connectors in the flow path.

It is the object of the invention to simplify the design and construction of an electrical continuous-flow water heater of the above defined type.

It is a more specific object of the invention to provide an electric continuous-flow water heater of the above defined type such that with low water flow rate in the through-flow path a correspondingly lower heating power is switched on permanently and a heating power also correspondingly reduced as compared with full load operation is switched on or off for control purposes.

Furthermore it is the object of the invention to provide an electronic power output stage of the above mentioned type, in particular for controlling the outlet temperature of electric continuous-flow water heaters such that, on one hand, signals are generated, by which one or two respectively, of three half waves of the mains a.c. voltage are passed and, on the other hand, a respective one of the signals is applied through switching means independent of these signals, to the semiconductor relay for the control thereof.

The direct current average of the current flowing through the load is to be zero.

According to the invention the objects of the invention with respect of the continuous-flow water heater are achieved in that (g) the through-flow path comprises at least six geometrically parallel straight heating passages, which are formed in a common passage block, (h) the heating resistors at the ends of the heating passages are passed out of the passage block with first and second heating resistor ends respectively, (i) the first heating resistor ends are directly connected to terminals of the switching means, (j) the second heating resistor ends of the first heating resistors are interconnected and (k) the second heating resistor ends of the second heating resistors are connected to terminals of the switching means through the electronic output power stages.

Modifications of the invention, which also serve to achieve this above mentioned more specific object, are subject matter of the corresponding sub-claims.

According to the invention, the above mentioned object in respect of the power output stage is achieved in that (f) the frequency divider has a first output, at which an output signal is set by each third pulse and is reset by the following pulse, (g) the frequency divider has a second output, at which an output signal is set by an edge of each third pulse and is reset by the corresponding edge of the respective next but one pulse, (h) the semiconductor relay is arranged to be rendered conductive for one half cycle, if a signal is applied to a control input at the time of the cross-over of the mains voltage, and (i) the first or the second output of the frequency divider is applied to the control input by said means for controlling the semiconductor relay depending on a further switching state.

The Schmitt-trigger supplies square wave pulses in the region of the maxima and minima respectively of the mains a.c. voltage, the edges of these square wave pulses being sufficiently spaced from the cross-over points of the mains a.c. voltage. Such a cross-over is always located between two adjacent pulses of the Schmitt-trigger. If an output signal is set at the first output of the frequency divider by such a pulse and this output signal is reset by the next but one pulse, the output signal is applied to the a.c. voltage during the intermediate cross-over. Consequently the semiconductor relay is rendered conductive for the half cycle following the cross-over. As only each third pulse of the pulse sequence sets such an output signal the semiconductor relay is also set only for each third half wave of the mains a.c. voltage. This has the consequence, that successive half waves connected through have opposite polarity such that the direct current average of the flowing current becomes zero.

At the second output of the frequency divider a signal is set by an edge of a pulse and is reset by the corresponding edge of the next but one pulse. Consequently a signal appears at the second output of the frequency divider, which is applied to the mains a.c. voltage during two successive cross-over points. If the semiconductor relay is controlled by the signal at the second output of the frequency divider, a full wave of the mains a.c. voltage is connected through by the semiconductor relay while the following half wave is not connected through. Also with this mode of operation successive waves connected through of the mains a.c. voltage are in antiphase such that the direct current average of the current flowing through the load becomes zero.

The signals thus made available at the frequency divider determine already unambigously the respective mode of operation of the semiconductor ralay. They can be applied to the semiconductor relay in different ways. In the most simple case the said means for controlling the semiconductor relay are formed by a selector switch, the position of which represents the said "further switching state". But the invention also provides the possibility to apply the output signals of the frequency divider to semiconductor relay in three phases of a three phase current through an appropriate logic circuit as a function of a control system output signal such that the total power can be switched in relatively small steps.

Modifications of the invention are subject matter of the corresponding sub-claims.

Embodiments of the invention will now be described in greater detail with reference to the accompanying drawings.

Figure 1:
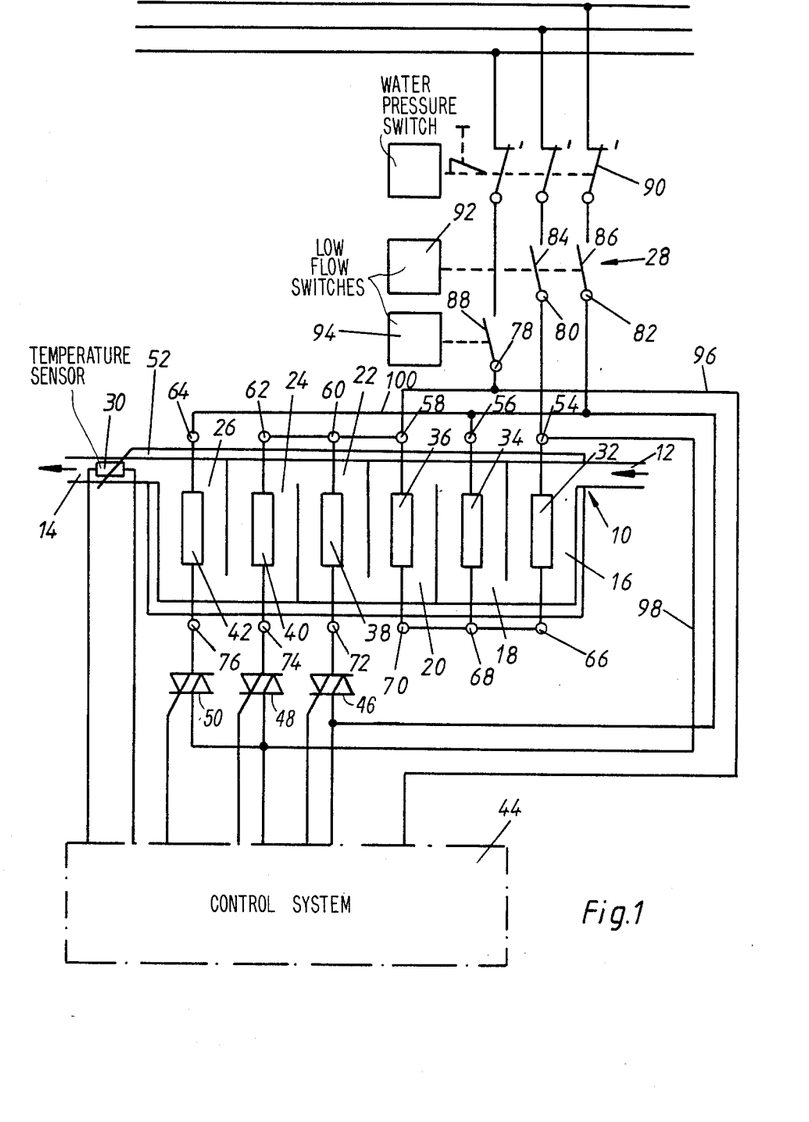
FIG. 1 is a schematic illustration of an electric continuous-flow water heater with controllable outlet temperature.
Figure 2:
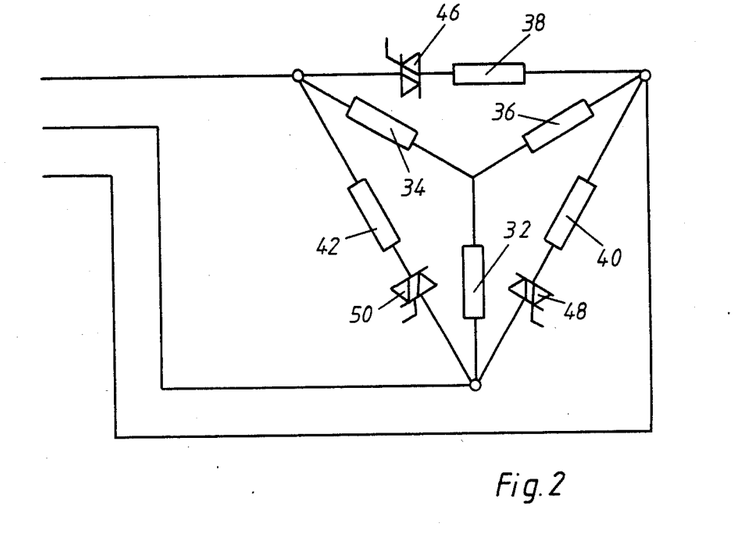
FIG. 2 shows the connection of the heating resistors with full load operation, that is at high water flow rate in the through-flow path, when all heating resistors are effective.
Figure 3:
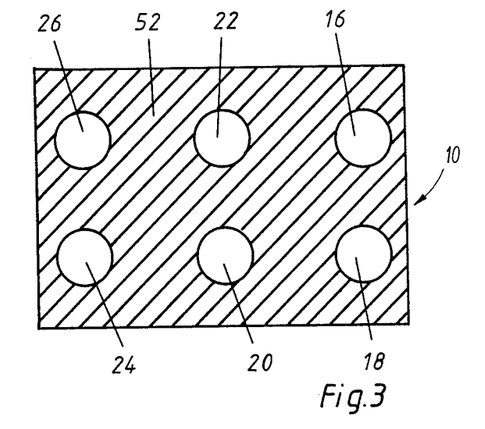
FIG. 3 is a schematic illustration of a passage block with the heating passages provided therein

The electric continuous-flow water heater as shown in FIGS. 1 to 3 has a through-flow path 10 from a cold water inlet 12 to a hot water outlet 14 with a plurality of, namely six, heating pasages 16, 18, 20 and 22, 24, 26 connected in series in the flow path. Furthermore the continuous-flow water heater comprises three poles switching means 28 arranged to be connected to three phases of a three phase current and responding to water flow rate in the through-flow path 10. A temperature sensor 30 is arranged on the outlet side in the through-flow path.

First heating resistors 32,34 and 36 are arranged in the heating passages 16, 18 and 20, respectively, and are arranged to be switched on by the switching means 28 when a predetermined flow rate is reached.

Second heating resistors 38,40 and 42 are arranged in the heating passages 22,24 and 26, respectively. A control system 44, which can be of the type disclosed in DE-OS No. 28 37 934, is connected to the temperature sensor 30. The heating resistors 38,40 and 42 are controllable by the control system through electric power output stages with triacs 46 and 48 and 50, respectively.

As can be seen from FIG. 3, the through-flow path 10 has six geometrically parallel straight heating passages 16,18,20,22,24 and 26, which are formed in a common passage block 52. The heating resistors 32,34,36,38,40 and 42 are uninsulated heating coils arranged in the heating passages. The heating resistors extend out of the passage block 52 at the ends if the heating passages 16,18,20,22,24 and 26 with first heating resistor ends 54,56,58 and 60,62, 64, and second heating resistor ends 66,68,70 and 72,74,76. The first heating resistor ends 54 to 64 are directly connected to terminals 78,80,82 of the switching means 28. The second heating resistor ends 66,68,70 of the first heating resistors 32,34,36 are interconnected, the second heating resistor ends 72,74,76 are connected to terminals 80,82 of the switching means 28 through the triacs 46,48,50 of the electronic power output stages.

As can be seen from FIG. 1, the first heating resistor ends 54,56,58 of the first heating resistors 32,34,36 are connected to one terminal each 80 and 82 and 78, respectively, of the three-pole switching means 28. Because the second heating resistor ends 66,68 and 70 of the first heating resistors 32, 34,36 are interconnected, the first heating resistors 32,34 and 36 are arranged in a star circuit, when one phase of the three-phase current is applied to each of the three terminals 78,70 and 82 of the switching means 28. Of the second heating resistors 38,40, 42 the first heating resistor end 64 of a heating reistor 42 is connected to a first terminal 78 of the switching means 28 and the first heating resistor ends 60 and 62 of the two other heating resistors 38 and 40 are connected to a second terminal 82 of the switching means 28. Furthermore, of the second heating resistors 38,40,42, the second heating resistor ends 76 and 74 of the said one heating resistor 42 and one of the two other heating resistors, namely of the heating resistor 40 are connected to a third terminal 80 of the switching means 28 through one triac each 50 and 48, respectively, which forms part of the electronic power output stage. The second heating resistor end 72 of the heating resistor 38 is also connected to the said first terminal 82 through a triac 46. The switching means 28 comprise flow rate-controlled switch contacts 84 and 86 and close at a first lower flow rate in the through-flow path. The first and the third terminal 82 and 80, respectively, of the switching means 28 are arranged to be connected to respective phases of the three-phase current through the switch contacts 84 and 86. The switching means 28 comprise a further flow rate-controlled switch contact 88 and closes at a second, higher flow rate in the through-flow path 10. The second terminal 78 of the switching means 28 is arranged to be connected to the remaining phase of the three-phase current through the switch contact 88.

Furthermore a three-pole pressure controlled switch 90 is provided, through which all three phases of the three-phase current are switched off, when water pressure breaks down. In FIG. 1 the switch contacts 84 and 86, on one hand, and the switch contact 88, on the other hand, are controlled by one sensor each 92 and 94, respectively, responding to the flow rate. In practice the sensors 92 and 94 and the switch contacts 84,86 and 88 form a unit. First the switch contacts 84 and 86 and then the switch contact 88 are successively closed by a biased diaphragm exposed to the differential pressure in the through-flow path.

Closing of the switching contact 88 is signalled to the control system 44 through a line 96.

The arrangement described operates as follows:

In each case, a fixed heating power is switched on through the first heating resistors, and a controllable heating power is switched on, at the same time, through the second heating resistors. However two modes of operation result depending on the flow rate in the through-flow passage 10: Only the switch contacts 84 and 86 of the switching means 28 are closed when the water flow rate is low. In this case the heating resistors 32 and 34 are connected in series between two phases of the three-phase current. Thereby a relatively low fixed heating power results. At the same time, a controllable heating power is generated in the heating passage 26 by the heating resistor 42. The circuit is closed through the switching contact 84 to the terminal 80 through a line 98 and the triac 50 to the second heating resistor end 76 of the heating resistor 42, further through the heating resistor 42, the heating resistor end 64 and a line 100 to a terminal 82 and the switching contact 86 of the switching means 28. Thus, with low flow rates, heating with a low fixed heating power through heating resistors 32 and 34 and with a relatively low variable heating power through the heating resistor 42 will result. The circuit of the heating resistors 36,38 and 40 are broken by the switching contact 88.

The switching contact 88 closes also when the flow rate exceeds a certain higher threshold value in the through-flow path 10. Now a circuit as illustrated in FIG. 2 is established. The three first heating resistors 32,34 and 36 are arranged in a star connection, as has already been mentioned, while the heating resistors 38,40,42 form a delta circuit with the triacs 46,48 and 50, respectively connected in series. In a continuous-flow water heater of 18 kw total power, the basic power, for example, which is provided by the heating resistors 32,34 and 36 can amount to 6 kW while the controllable power amounts to 12 kW in delta curcuit.

Figure 4:
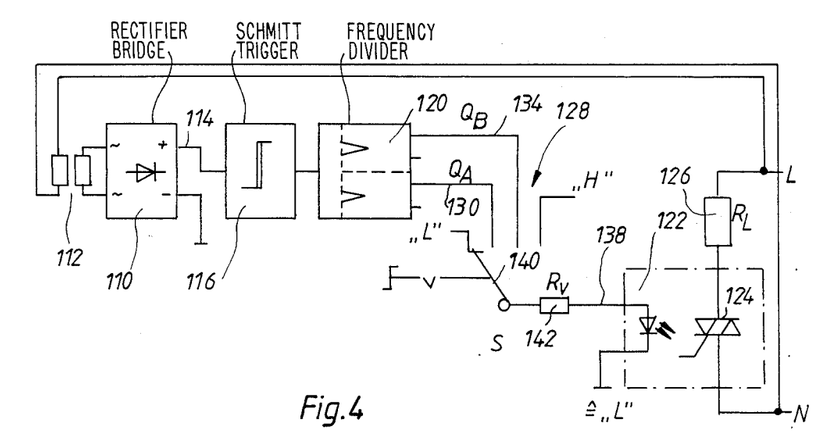
FIG. 4 shows schematically a first embodiment of an electronic power output stage.

The power output stage of FIG. 4 is particularly adapted for an electric continuous-flow water heater of the above described type, for example, with heating resistors being arranged in the heating passages, and has a rectifier bridge 110, to which mains-frequency alternating voltage in-phase with the mains-frequency is applied through a transformer 112. The rectifier bride 110 supplies a d.c. voltage pulsating with twice the mains frequency at an output 114. This pulsating d.c. voltage is applied to a Schmitt-trigger 116. The Schmitt-trigger 116 generates a square wave pulse sequence, which is illustrated in the second line of FIG. 5. The Schmitt-trigger is triggered as long as the signal applied thereto exceeds a predetermined threshold value. That means, that the square wave pulses 118 are essentially symetrical to the maxima and minima of the mains a.c. voltage and spaced from the cross-over points of the mains a.c. voltage. The square wave pulse sequence is applied to a frequency divider 121. 122 designates a semiconductor relay with zero voltage switch performance. The semiconductor relay 122 comprises a triac 124, which is applied to the mains a.c. voltage in series with a load. Means 128 are provided for controlling the semiconductor relay 122 as a function of output signals from the frequency divider 121. In the described arrangement the frequency divider 120 consists of two JK flip-flops. Only two outputs of the four outputs of the JK flip flops are used. An output signal 132 appears at a first output 130 (FIG. 5), which is set by an edge, here the front edge, of each third pulse 118 of the square wave pulse sequence and is reset by the corresponding edge of the following pulse 118. Thus the output signal at the output 130 is a pulse sequence as illustrated in the third line of FIG. 5. An output signal 136 appears at a second output 134 of the frequency divider 120. This output signal is set by an edge of each third pulse 118 of the square wave pulse sequence and is reset by the corresponding edge of the next but one pulse, respectively. The output signal 136 supplies a pulse sequence as illustrated in the fourth line of FIG. 5. The semiconductor relay 122 is arranged to be rendered conductive for one semiconductor cycle when a signal is applied to a control input 138 at the time of the cross-over of the mains voltage. Such semiconductor relays are known per se and commercially available. Therefore the construction of the semiconductor relay 122 is indicated only schematically.

Figure 5:
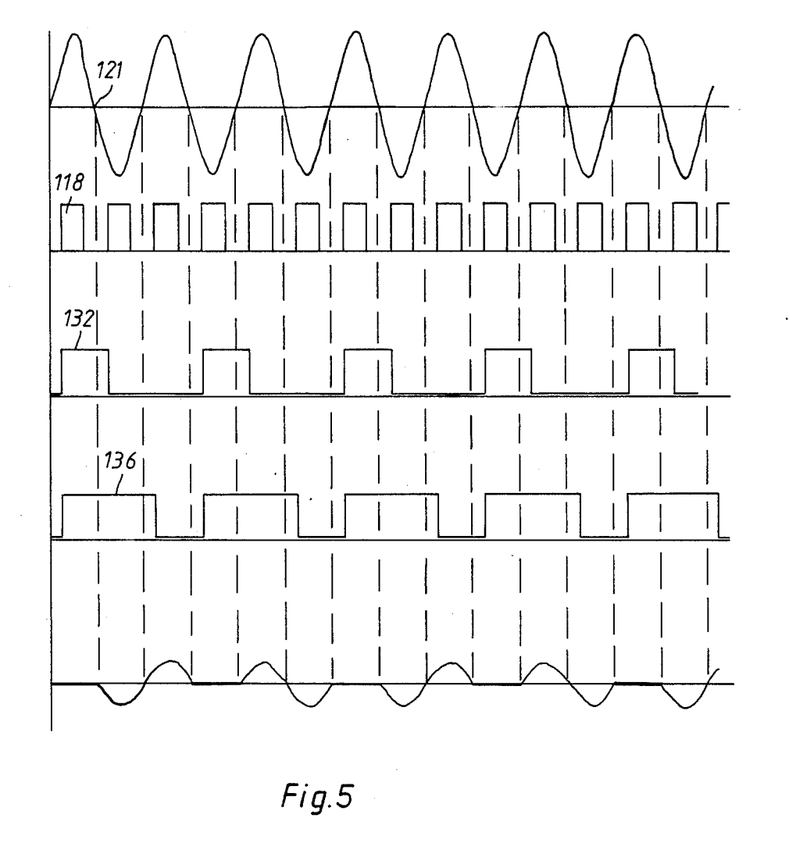
FIG. 5 shows the signal wave forms which appear at the power output stage of FIG. 4.

As can be seen from FIG. 5 a cross-over 120 of the mains a.c. voltage is located between two adjacent pulses 118 of the square wave pulse sequence. Each pulse of the output signal 132 coincides with such a cross-over. Between successive pulses of the output signal 132, there are always two cross-over points of the mains a.c. voltage in which no output signal 132 appears at the output 130. Each pulse of the output signal 136 at the output 134 of the frequency divider 120 extends over two successive cross-over points of the mains a.c. voltage. A cross-over of the mains a.c. voltage during which no signal appears at the output 134, is located between successive pulses of the output signal 136. If the semiconductor relay 122 is controlled by the first output signal 132, the semiconductor relay becomes conductive during one half cycle of the mains a.c. voltage, which is then followed by two half cycles during which the semiconductor relay 122 does not pass current. If the semiconductor relay 122 is controlled by the second output signal 136 at the output 134, it becomes conductive during two successive half cycles, which are followed by a half cycle during which the semiconductor relay 122 is not conductive. Then the current through the load 126 has the wavw form illustrated in the last but one line of FIG. 5. In the embodiment of FIG. 4. The means 128 for controlling the semiconductor relay are formed by a selector switch, the switch arm 140 of which is optionally connected to ground (signal "L"), to the first output 130, to the second output 134 of the frequency divider 120 or to a continuous signal "H". The switch arm 140 is connected to the input 138 through a resistor 142.

Figure 6:
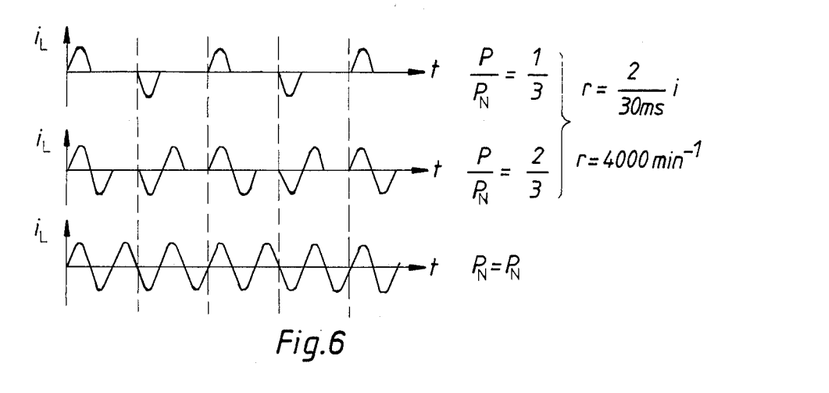
FIG. 6 shows the three possibilities of the current passed through the load by the power output stage.

Different wave forms can be generated through the load 126 with such an arrangement, as illustrated in FIG. 6. If the switch arm 140 is continuously connected to the signal "L", the triac 124 is continuously rendered non-conductive. No current flows. It the switch arm 140 is connected to the output 130 of the frequency divider 120, each third half wave of the mains a.c. voltage is passed to the load 126, as illustrated in the first line of FIG. 6. If the switch arm 140 is connected to the third output 134 of the frequency divider 120, a wave form an illustrated in the second line of FIG. 6 result in the load 126, as has been already explained with reference to FIG. 5. If the switch arm 140 is connected to the continuous signal "H", the triac 124 continuously remains conductive. All of the mains a.c. voltage is passed to the load 126, the associated heating resistor in the embodiment. Accordingly the load 126 is switched off, energized with ⅓ of the power, with ⅔ of the power or with the full power depending on the position of the switch arm 140. As can be seen from FIG. 6, the direct current average of the current flowing through the load 126 is zero in each case.

Figure 7:
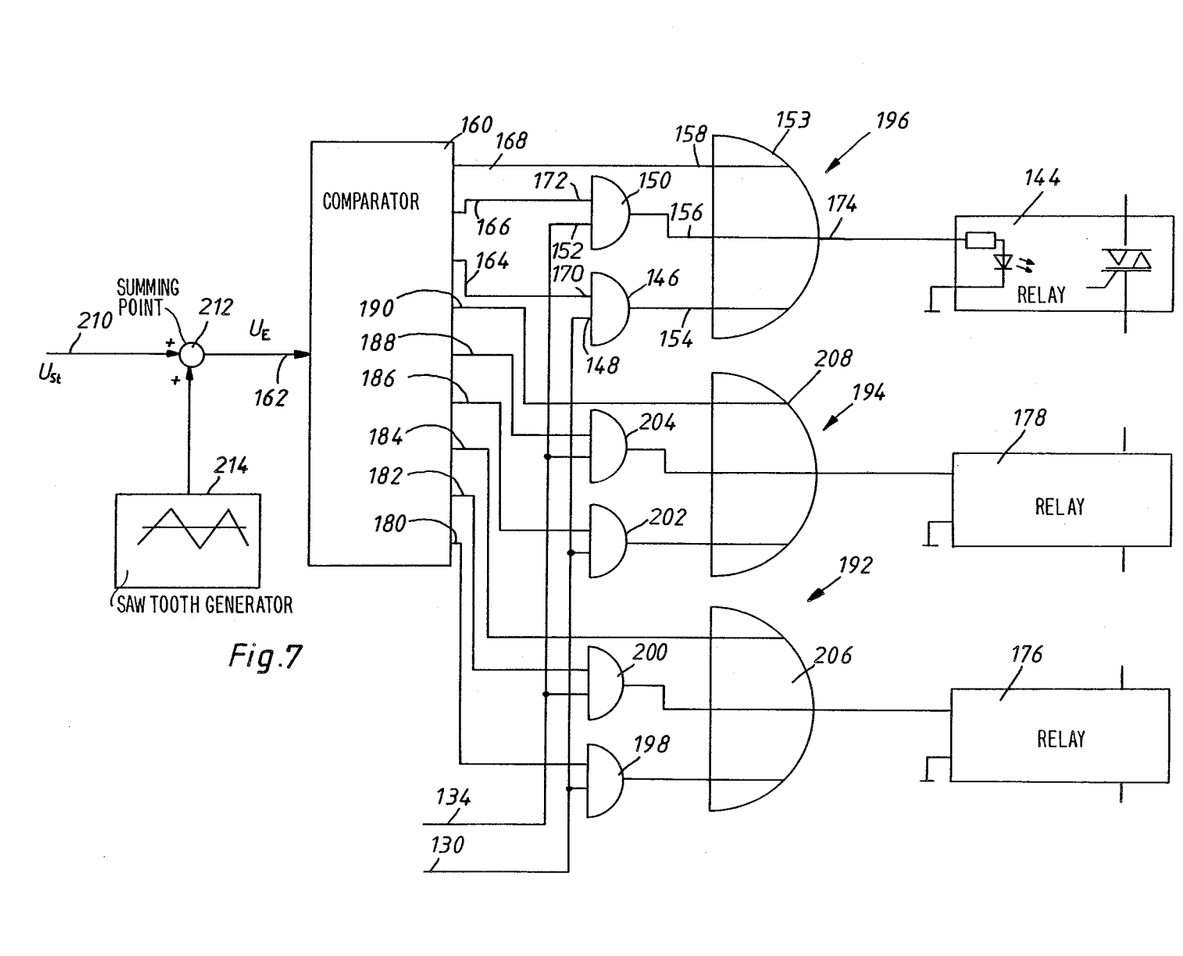
FIG. 7 shows another embodiment of an electronic power output stage for three phase current, which is adapted particularly for the control of the outlet temperature of electric continuous-flow water heaters.

In the embodiment of FIG. 7 the "means for controlling the semiconductor relay" for one semiconductor relay 144 comprise a first AND-gate 146, one input 148 of which is connected to the first output 130 of the frequency divider, and a second AND-gate 150, one input 152 of which is connected to the second output 134 of the frequency divider 120, and an OR-gate 153 with three inputs 154,156 and 158. Furthermore, a comparator 160 is provided, which supplies output signals to a first, a second and a third output 164 and 166, and 168 respectively, as a function of an input signal at the input 162, when stepped threshold values are exceeded. The first output 164 of the comparator 160 is connected to the other input 170 of the first AND-gate 146. The second output 166 of the comparator 160 is connected to the other input 172 of the second AND-gate 150. The outputs of the AND-gates 146 and 150 are connected to the first input 154 and the second input 156, respectively, of the OR-gate 153. The third output 168 of the comparator 160 is connected to the third input 158 of the OR-gate 153. The output 174 of the OR-gate 153 controls the semiconductor relay 144.

A signal "H" appears successively at the outputs 164,166 and 168 when the input signal rises. An output signal appears at the first output 164 of the comparator 160 with a relatively small input signal corresponding to a relatively small error, for example. Therefore the signal 132 (FIG. 5) of the output 130 of the frequency divider 120 becomes effective at the input 154 of the OR-gate 153 through the AND-gate 146, while no signal is applied to the inputs 156 and 158 of the OR-gate 153. The signal (132), which thus appears at the output 174 of the OR-gate 153, renders the semiconductor relay 144 conductive during each third halve wave so that a current corresponding to the first line of FIG. 6 flows through the load. A signal "H" appears also at the output 166 of the comparator 160 when the signal at the input 162 rises further. Now the signal 136 of the output 132 of the frequency divider 120 becomes effective through the AND-gate 150 at the input 156 of the OR-gate 153 and thus also at the output 174 of the OR-gate 153. The semiconductor relay 144 is rendered conductive during two out of three half cycles of the a.c. voltage such that a current corresponding to the second line of FIG. 6 flows through the load. Finally when the signal at the input 132 rises further, a signal "H" also becomes effective at the third output 168 of the comparator 160, which is connected directly to the third input 158 of the OR-gate 153. Therefore a continuous signal "H" appears at the output 174 of the OR-gate 153. The semiconductor relay 144 is rendered conductive continuously, such that the full mains a.c. voltage becomes effective at the load 126.

In the preferred embodiment illustrated in FIG. 7, three semiconductor relays 176, 178 and 144 are provided for one phase of a three-phase current. The comparator 160 has three groups of outputs 180, 182,184 and 186,188,190 and 164,166,168. Each of these groups of outputs is applied to a logic circuit respectively 192,194,196 of two AND-gates 198,200 and 202,204 and 146,150 and one OR-gate 206,208,153, said logic circuit being wired in a way described with reference to group 196 and having also applied thereto the outputs 130,134 of the frequency divider 120. One of the three semiconductor relays to controllable by each of the logic curcuits 192,194 and 196, respectively. In the described arrangement the sign "H" appears successively at the outputs 180, 182,184,186,188,164,166 and 168, when the signal at the input 162 rises. Therefore the semiconductor relay 176 is controlled, at first, in three steps through the logic circuit 192 in the way described until the phase of the three-phase current controlled by the semiconductor relay 176 is fully pased, when a signal appears at the output 184. When the input signal rises further the second phase of the three-phase current is controlled in three steps through the semiconductor relay 178 in the way described, while the first phase continues to be fully connected. Finally the third phase of the three-phase current is controlled trough the outputs 164, 166 and 168 by means of the semiconductor relay 144. Thus the installed power can be switched in nine steps altogether. In the illustrated embodiment the three phases of the three-phase current are successively connected into circuit step-by-step. Instead of this it is also possible to switch on each of the three phases successively with one third of the power, then each of the phases successively with two thirds of the power and finally each of the phases with full power.

Another possibility (when a comparator with three outputs is used) consists in controlling all three semiconductor relays 176,178 and 144 at the same time and switching them in three steps.

The first variant is obtained in that the connection of the AND-gates with the outputs 182 and 186, with the outputs 184 and 164 and with the outputs 190 and 166 are interchanged. This variant offers the advantage that the three-phase current is more uniformly loaded.

In the illustrated embodiment the input signal at the input 162 of the comparator 160 is formed by a continuously variable control voltage at an input 210 and a saw-tooth voltage from a saw-tooth generator 214 superimposed to the control voltage in a summing point 212. Such an arrangement effects a pulse width modulation the power being switched back and forth between the two highest controlled power stages. A signal "H" appears at the output 190 as continuous signal, for example, while a signal appears at the output 164 with a pulse width, which changes continuously with the signal at the input 210. In this way the power supplied can be changed continuously. The pulsed power corresponds to the power difference between two successive stages. The frequency, the power is pulsed with, is determined by the saw-tooth generator 214.

A temperature control for an electric continuous-flow water heater can be provided with an arrangement of the type described, with which the requirement of DIN EN 50006/VDE 0838 are met.

I claim:

1. Electronic power output stage, particularly for controlling the outlet temperature of electric continuous-flow water heaters, comprising (a) a rectifier bridge (110) connected to a mains-frequency a.c. voltage, which supplies a d.c. voltage pulsating with twice the mains frequency, the mains-frequency a.c. voltage having zero voltage crossovers (121) between successive maxima and minima voltages, (b) a Schmitt-trigger (116) to which the pulsating d.c. voltage is applied for generating a square wave pulse sequence with twice the mains frequency, (c) a frequency divider (120) to which the square wave pulse sequence is applied, (d) a semiconductor relay (122) with zero voltage switch performance being connected to the mains a.c. voltage, and arranged to switch the power and (e) means (128) for controlling the semiconductor relay (122) as a function of output signals of the frequency divider, characterized in that (f) the frequency dividers (120) has a first output (130), at which an output signal (132) is set by an edge of each third pulse (118) and in reset by a predetermined corresponding edge of a predetermined following pulse (118), (g) the frequency divider (120) has a second output (134), at which an output signal (136) is set by an edge of each third pulse (118) and is reset by a predetermined corresponding edge of a predetermined following pulse (118), (h) the semiconductor relay (122) is arranged to be rendered conductive for one half cycle, if a signal is applied to a control input (138) at the time of a zero cross-over (121) of the mains voltage and (j) the first or the second output (130 and 134 respectively) of the frequency divider (120) is applied to a control input (138) by the said means (128) for controlling the semiconductor relay (122) depending on a further switching state.

2. Electronic power output stage as set forth in claim 1, characterized in that the said means (128) for controlling the semiconductor relay are formed by a selector switch, the position of which represents the said further switching state.

3. Electronic power output stage as set forth in claim 2, wherein no signal or continuous signal is applied to the control iput (138) of the semiconductor relay (122) through the selector switch.

4. Electronic power output state as set forth in claim 1, characterized in that the said means (128) for controlling the semiconductor relay (122) comprise (a) a first AND-gate (146), having an output, and one input (148) which is connected to the first output (130) of the frequency divider (120), and (b) a second AND-gate (150), having an output, and one input (152) which is connected to the second output (134) of the frequency divider (120), (c) an OR-gate (153) with first, second and third inputs (154, 156, 158), to the first input (154) of which an output of the first AND-gate (146) is applied and to the second input (156) of which the output of the second AND-gate (150) is applied, and (d) comparator means (160),
  (d$_1$) which supply output signals to a first, a second and a third output (164, 166, 168) as a function of an input signal when stepped threshold values are exceeded and
  (d$_2$) the first output (164) of which is connected to the other input (170) of the first AND-gate (146), the second output (166) of which is connected to the other input (172) of the second AND-gate (150) and the third output (168) of which is connected to the third input (158) of the OR-gate (153).

5. Electronic power output stage as set forth in claim 4 characterized in that, (a) three semiconductor relays (176, 178, 144), one of said relays being provided for each phase of a three-phase current, (b) each of the comparator means (160) comprises three groups of three outputs (180, 182, 184; 186, 188, 190; 164, 166, 168) and (c) each of these groups of outputs is applied to a logic circuit (192, 194, 196) of two AND-gate (198, 200; 202, 204; 146, 150) and an OR-gate (206, 208, 159), said logic circuit having also applied thereto the outputs (130, 134) of the frequency divider (120), and (d) a respective one of the three semiconductor relays (176, 178, 144) is controllable by each of the logic circuits (192, 194, 196).

6. Electronic actuator as set forth in claim 1, characterized in that the input signal of the comparator (160) is formed by a continuously variable control voltage and a saw-tooth voltage superimposed to the control voltage.

* * * * *